United States Patent [19]

Verhille et al.

[11] Patent Number: 5,309,430
[45] Date of Patent: May 3, 1994

[54] TELECOMMUNICATION SYSTEM

[75] Inventors: Henri A. J. Verhille, Brecht;
Michel A. R. Henrion, Brussels;
Michel P. De Somer, Kontich;
Bart J. G. Pauwels, Borgerhout,
all of Belgium

[73] Assignee: Alcatel N.V., Netherlands

[21] Appl. No.: 918,450

[22] Filed: Jul. 22, 1992

[30] Foreign Application Priority Data

Jul. 22, 1991 [EP] European Pat. Off. ......... 91201915.5

[51] Int. Cl.$^5$ .............................................. H01Q 11/04
[52] U.S. Cl. ..................................... 370/60; 370/94.1
[58] Field of Search ................................ 370/60, 94.1

[56] References Cited

U.S. PATENT DOCUMENTS

| 4,955,016 | 9/1990 | Eng et al. | 370/60 |
| 4,955,017 | 9/1990 | Eng et al. | 370/60 |
| 5,072,440 | 12/1991 | Isono et al. | 370/60 |
| 5,084,867 | 1/1992 | Tachibana et al. | 370/60 |
| 5,214,639 | 5/1993 | Herion | 370/60 |

FOREIGN PATENT DOCUMENTS

| 0260364 | 3/1988 | European Pat. Off. | H04L 11/20 |
| 0446493 | 9/1991 | European Pat. Off. | H04L 12/56 |
| WO9102420 | 2/1991 | PCT Int'l Appl. | H04L 12/56 |
| 8603355 | 6/1986 | World Int. Prop. O. | H04L 11/20 |

OTHER PUBLICATIONS

IEEE Inforcom '90, The Conference of Computer Communications, Jun. 3, 1990, San Francisco, U.S., pp. 668–676 S. Liew et al. "Performance Analysis of Asymmetric Pocket Switch Modules with Change/Grouping".

Ohtsuki et al. "A High-Speed Packet Switch Architecture with a Multichannel Bandwidth Allocating" Proceedings of Infocom '91, pp. 155–162.

Primary Examiner—Douglas W. Olms
Assistant Examiner—Russell W. Blum
Attorney, Agent, or Firm—Ware, Fressola, Van Der Sluys & Adolphson

[57] ABSTRACT

A telecommunication system for transmitting cells through switching nodes (N1–3) interconnected by groups (LG12, LG23) of transmission links, each node including an asynchronous switching network (SN1–3) which comprises several switch elements. At least one of these switch elements possesses a routing group possibility whereby the cells are distributed over its outlets and so further over the different transmission links of the link group to which the switching network is connected. This distribution is performed in function of a self-routing tag which is derived from external routing data associated with the cell. At the input ports of either each or only the first switching network (SN1) of the system, the external routing data is translated in a self-routing tag which is for instance added to the header of the cell, while at the output ports of each or of only the last switching network (SN3) of the system respectively, the self-routing tag is removed from this header. Some switch elements possess a multicast possibility whereby the cells are transferred to several outlets thereof and thereby to several link groups to which the switching network is connected.

9 Claims, 8 Drawing Sheets

TELECOMMUNICATION SYSTEM

TECHNICAL FIELD

The present invention relates to a telecommunication system including at least a first and a second switching node interconnected by a group of at least two transmission links over which cells of information are transferred, each switching node including an asynchronous switching network having input ports and output ports and including a plurality of switch elements arranged in several stages between said input ports and said output ports, the transmission links of said group interconnecting a set of output ports of the switching network of said first node with a set of input ports of the switching network of said second node, each of said switch elements having inlets and outlets and being able to transfer a cell received on one of its inlets to one or several of its outlets as a function of routing data associated with said cell, the input ports and the output ports of each switching network corresponding to the inlets and to the outlets of the switch elements of a first stage and of a last stage respectively.

BACKGROUND OF THE INVENTION

Such a telecommunication system wherein the switching nodes are, e.g., geographically distributed already exists in the art and the idea of distributing individual cells or packets over anyone of the available transmission links of a link group is already known as it appears for instance from the article "A High-Speed Packet Switch Architecture With A Multichannel Bandwidth Allocation" by K. Ohtsuki et al, published as paper 3A.2 of the Proceedings of Infocom '91, pages 0155 to 0162. However, a problem with such a known telecommunication system is to dynamically control the distribution of the cells over the transmission links in order to optimize the traffic load over the corresponding link group.

A possible solution to that problem is for instance to insert a cell distributor between the output ports of the switching network of the first switching node and the link group, and a complementary cell combiner between this link group and the input ports of the switching network of the second switching node. However, such interfaces (distributor and combiner) require additional hardware equipment and are complex to control in order to obtain the expected dynamic cell distribution.

DISCLOSURE OF INVENTION

An object of the present invention is to provide a telecommunication system of the above known type, but wherein the cell traffic is dynamically distributed over the transmission links of a link group in an easy way and without requiring sophisticated additional hardware equipment.

According to the invention, this object is achieved due to the fact that, in said first switching node, the switching network includes at least one switch element which possesses at least three outlets arranged in groups of outlets, each group of outlets comprising at least one outlet, that said routing data designates said set of output ports to one output port of which said associated cell has to be transferred, and that, as a function of said routing data, said one switch element identifies a group of its outlets and transfers said cell to one outlet selected from among the outlets of said identified group of outlets.

In this way, the dynamic distribution of the cells over the transmission links of a link group is performed in the above one (or more) switch element(s), i.e. inside the switching network, and no more at the level of the output ports of the switching network of the first switching node, i.e. outside the switching network. Thus, already from inside the switching network, each cell is routed from one of the outlets of the identified group towards an output port forming part of the designated set of output ports. In other words, from this one switch element, the cells are distributed over a multiplicity of internal links for reaching one output port of the set of output ports connecting to the transmission links of the link group. Since the distribution is performed by the switch elements, i.e. inside the switching network, it is easy to control.

It is to be noted that the published International Patent Application No. WO91/02420 (PCT/EP89/00942) of Aug. 9, 1989 already discloses a switch element allowing the transfer of cells to a group of outlets, called routing group, and that an asynchronous switching network using such switch elements is disclosed in the French Patent Application FR-90.03246 of Mar. 14, 1991. However in this last document, the cells of a same communication, although distributed over different internal links of a multipath self-routing switching network, all exit at a single output port thereof, the latter being designated by an output port address (OPA). Moreover, the known asynchronous switching network is exhaustively built with switch elements having the routing group capability, i.e. being able to identify a group of outlets, and the routing data is used to identify such a group of outlets in each of the switch elements of all but the last stage through which the cell passes. In the present invention, the routing data associated to a cell is used for designating a set of output ports of the switching network. This set of output ports is designated by an output port group address (OPGA) which is used, by the switch element(s) having the routing group capability, in a similar way to the above output port address (OPA). Furthermore, although preferred, in the present invention a generalized multipath transfer capability of the switching network is not required as in the known multipath self-routing switching network, it is sufficient that only one switch element of the switching network has this routing group capability. This switching element may be located in any stage of the switching network.

The distribution of the cells over a multiplicity of internal links ensures load balancing which allows to obtain a traffic performance over the link group which is nearly equivalent to that of a single transmission link having a bandwidth equal to the total bandwidth of this link group. In other words, because of the distribution of the cells over the transmission links of a link group, such a link group can be seen as a large single virtual transmission link whose total bandwidth or traffic load capacity is equal to the sum of the traffic load capacities of each individual transmission link constituting this link group or, if the individual traffic load capacities of the transmission links are identical, to the maximum traffic load capacity of one transmission link multiplied by the number of these links. However, in practice it appears that the average traffic load usable on the link group or virtual transmission link is larger than the sum of the average traffic loads of each transmission link thereof taken individually. This is due to a better traffic load balancing over the transmission links of the link group. Moreover, when the bandwidth required by a communication exceeds the available bandwidth capacity of a single transmission link of a link group, the distribution of the cells of this communication over the transmission links of the link group allows this communication to be transmitted anyway.

Another characteristic feature of the present invention is that each cell is transferred through said switching networks according to a self-routing method, and that the routing process of a cell through said second switching node is independent of the input port out of said set of input ports at which said cell is received.

Still another characteristic feature of the present invention is that said routing data designates several sets of output ports, that said associated cell has to be transferred to one output port out of each of said sets, and that, as a function of said routing data, at least one second switch element identifies a set of groups of outlets and transfers, for each group of said identified set, said cell to one outlet selected from among the outlets of said group.

Also another characteristic feature of the present invention is that said routing data comprises internal routing information relative to the routing of said associated cell inside a switching network and external routing information relative to the routing of said associated cell outside a switching network, and that each switching node of said telecommunication system includes translation means to add said internal routing information to said routing data at the input ports of the switching network and includes conversion means to remove said internal routing information from said routing data at the output ports of the switching network, said added internal routing information being function of said external routing information.

This is the so-called node-by-node self-routing approach where distinct internal routing information may be defined and used in the different switching nodes through which the cell passes. The external routing information is for instance the virtual connection, channel and/or path identifier as defined in the Asynchronous Transfer Mode (ATM) technique. No internal routing information intrinsic to a particular switching network is transferred through the link groups but replicated translations/conversions are required at the entry (input ports) and at the exit (output ports) of each switching node of the telecommunication system.

A variant of this approach is characterized by the fact that only the first switching node of said telecommunication system includes said translation means to add internal routing information to said routing data at the input ports of the switching network of said first switching node, and that only the last switching node of said telecommunication system includes said conversion means to remove said internal routing information from said routing data at the output ports of the switching network of said last switching node.

This is the so-called end-to-end self-routing approach where the external routing information or virtual identifier is only translated at the entry and converted at the exit of the telecommunication system. Since a unique routing data is used through the whole telecommunication system, no replicated conversions/translations are needed between nodes but some bandwidth overhead is required on the transmission link between these nodes. However, the same internal routing information has then to be used by all the switching networks of the telecommunication system.

The present invention is also characterized by the fact that the cells either have a fixed or a variable length, and that they are for instance constituted by subcells each having a fixed length.

The above mentioned and other objects and features of the invention will become more apparent and the invention itself will be best understood by referring to the following description of an embodiment taken in conjunction with the accompanying drawings.

BEST MODE FOR CARRYING OUT THE INVENTION

Figure 1:
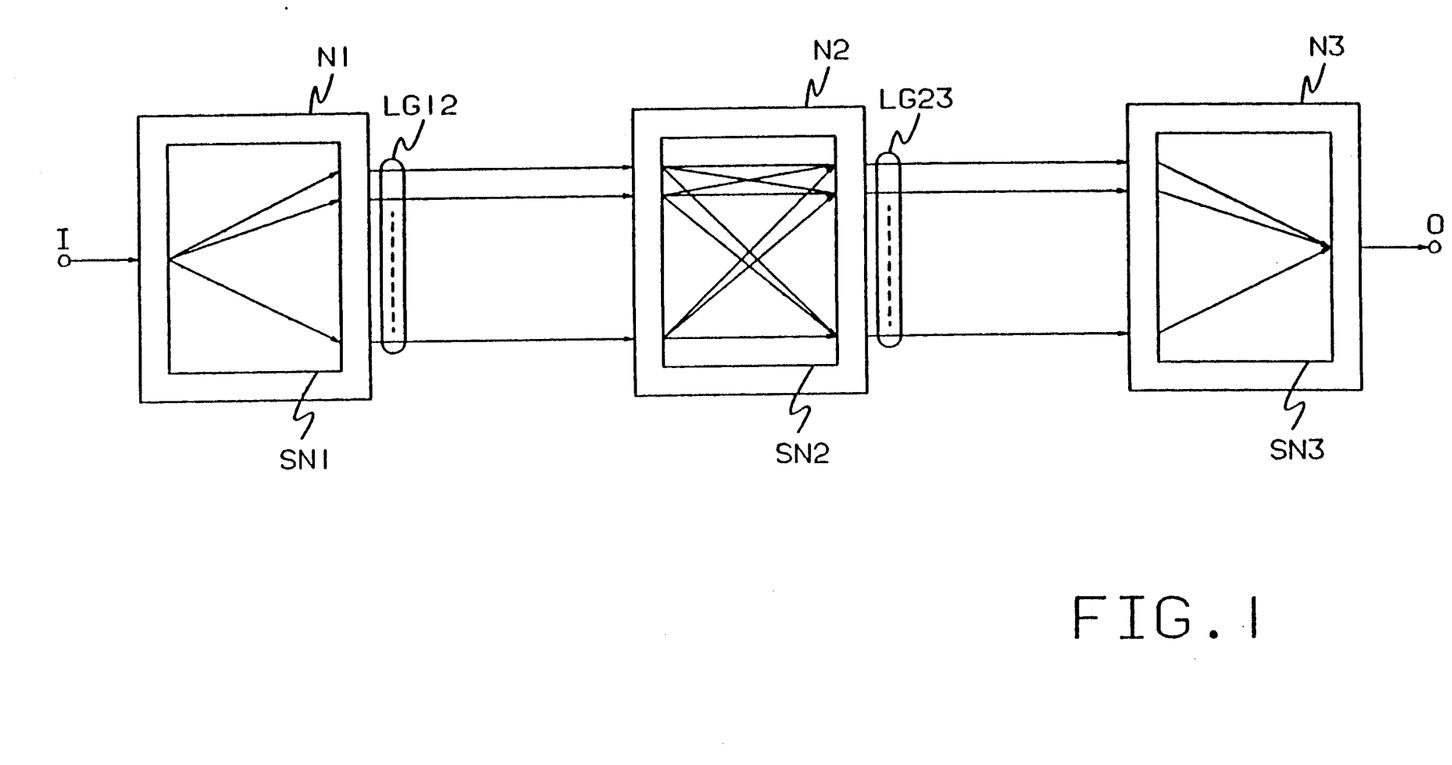
FIG. 1 shows a telecommunication system according to the invention.

The telecommunication system shown in FIG. 1 includes geographically distributed switching nodes N1, N2 and N3 which are interconnected by transmission links arranged in link groups LG12 and LG23. The link group LG12 interconnects a set of outputs of the switching node N1 to a set of inputs of the switching node N2, whilst the other link group LG23 interconnects a set of outputs of N2 to a set of inputs of N3. The transmission links, and thus also the link groups LG12 and LG23, may have a length of several kilometers.

The telecommunication system has input terminals connected to the inputs of the first switching node N1 and output terminals to which the outputs of the last switching node N3 are connected. Only one input terminal I and one output terminal O are shown in FIG. 1. The system is used for transferring cells or packets of communications, e.g. between subscriber sets (not shown) from the input terminal I to the output terminal O. Each communication is constituted by a plurality of independent cells which may be either mono- slot cells of fixed length, i.e. cells requiring a single time slot of the time multiplexing mode used to transmit them through the telecommunication system, or multi- slot cells having a fixed or a variable length, i.e. constituted by a fixed or by a variable number of subcells each subcell requiring for instance a single time slot. The cells are said to be transmitted asynchronously since the number of (free) time slots between two consecutive cells of a same communication is variable. Each cell includes a data field and a header which contains routing data relative to the destination of the cell, i.e. the output terminal(s) to which the cell is intended.

It is to be noted that, instead of being stored in the header of the cell, the routing data associated to a cell may be transmitted to the switching nodes N1, N2 and N3 of the telecommunication system via a path which may be different from that followed by the cell. This latter possibility will however not be discussed in more detail here.

Each switching node N1, N2 and N3 includes a respective switching network SN1, SN2, SN3 which transmits the cell from an input of the node to one or more outputs thereof according the routing data associated to the cell. Each switching network has input ports to which the inputs of the corresponding switching node are connected and output ports which are connected to the outputs of this switching node. In the following part of the description, a switching network will be generally indicated by SN.

When for instance the cells of a communication have to be transmitted from the input terminal I to the output terminal O, they first pass through the switching node N1 of which the switching network SN1 distributes these cells over the output ports of a set of output ports (SOP) connecting to the transmission links of the link group LG12. This means that each cell of that communication may be transmitted by SN1 to anyone of the outputs of N1 connected to this SOP. In the switching node N2, these cells are received at any input port of a set of input ports (SIP) of SN2 connected to the link group LG12 and this switching network SN2 further distributes the received cells to any output port of a SOP connecting to the link group LG23. Finally, in the switching node N3, the cells are received at any input port of a SIP of SN3 connected to the link group LG23 and this switching network SN3 transfers them to the output of N3 connecting to the output terminal O of the telecommunication system.

Figure 2:
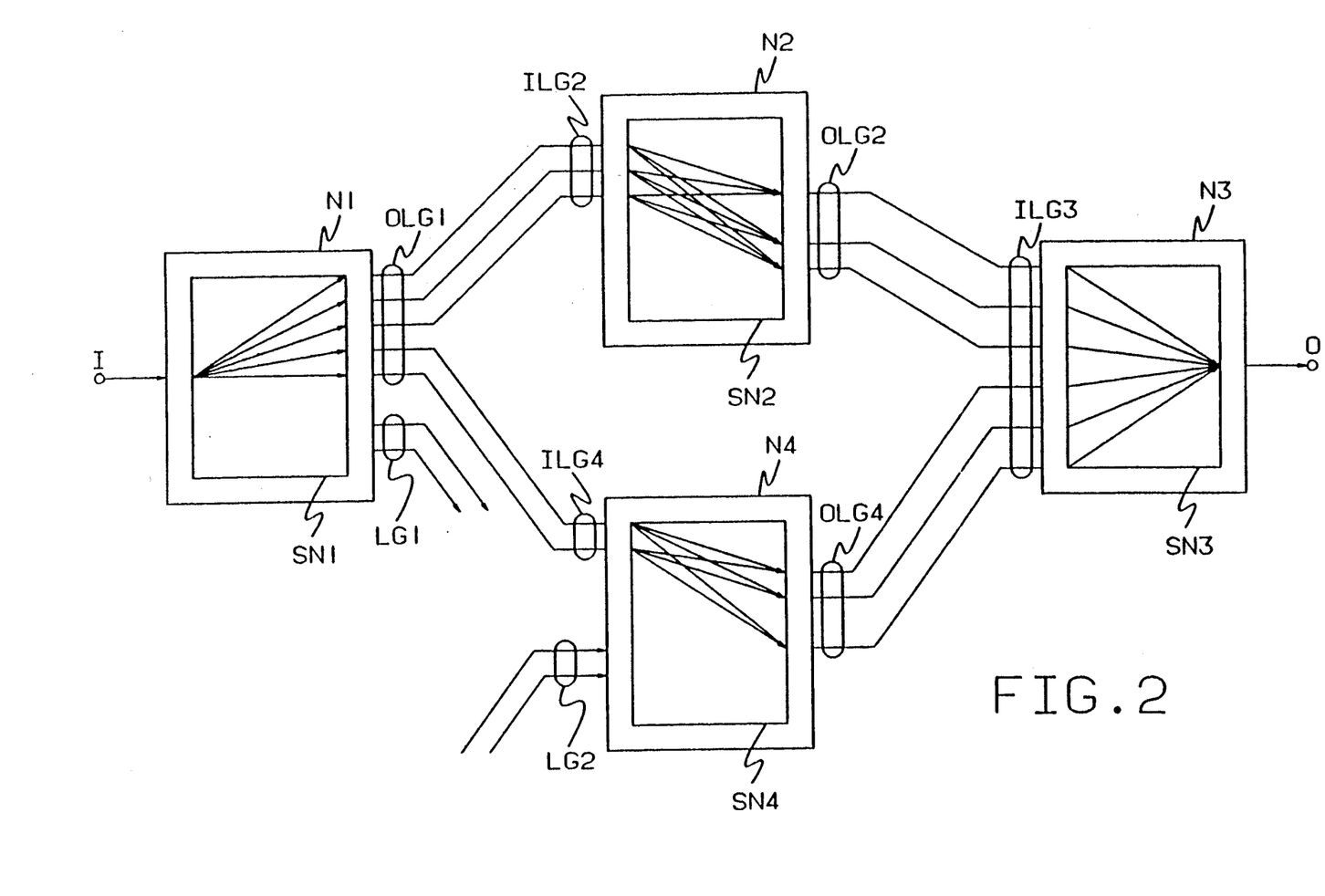
FIG. 2 shows a variant of the telecommunication system of FIG. 1.

This telecommunication system is only given as an example and many other configurations are possible. For instance, FIG. 2 shows a variant wherein, for the same example of transmission as above, the set of outputs ports (SOP) of the switching network SN1 is connected to an output link group OLG1 similar to LG12 but of which some transmission links are connected to a set of input ports (SIP) of SN2 via an input link group ILG2, whilst the remaining transmission links are connected to a SIP of a switching network SN4 of another switching node N4 via an input link group ILG4. Similarly to SN2, SN4 also distributes the cells received at any input port of the SIP connected to ILG4 to any output port of a SOP connecting to an output link group OLG4 which leads to a SIP of SN3. This set of input ports of SN3 is further also connected to the transmission links of an output link group OLG2 coming from N2. OLG2 together with the transmission links of the output link group OLG4 form an input link group ILG3 connecting to the SIP of SN3.

Such an architecture allows to automatically maintain the cell traffic flow over (at least) one route N1, N2, N3 or N1, N4, N3 in case of failure detected on another one, i.e. on a link group (cable) ILG2, OLG2, ILG4 or OLG4 or on a switching node N2 or N4.

It is to be noted that FIG. 2 may represent only a portion of a larger telecommunication system wherein each switching network may have several sets of outputs ports (SOP) connecting to distinct link groups, e.g. OLG1 and LG1 for SN1, and/or may have several sets of inputs ports (SIP) to which distinct link groups, e.g. ILG4 and LG2 for SN4, are connected.

Figure 3:
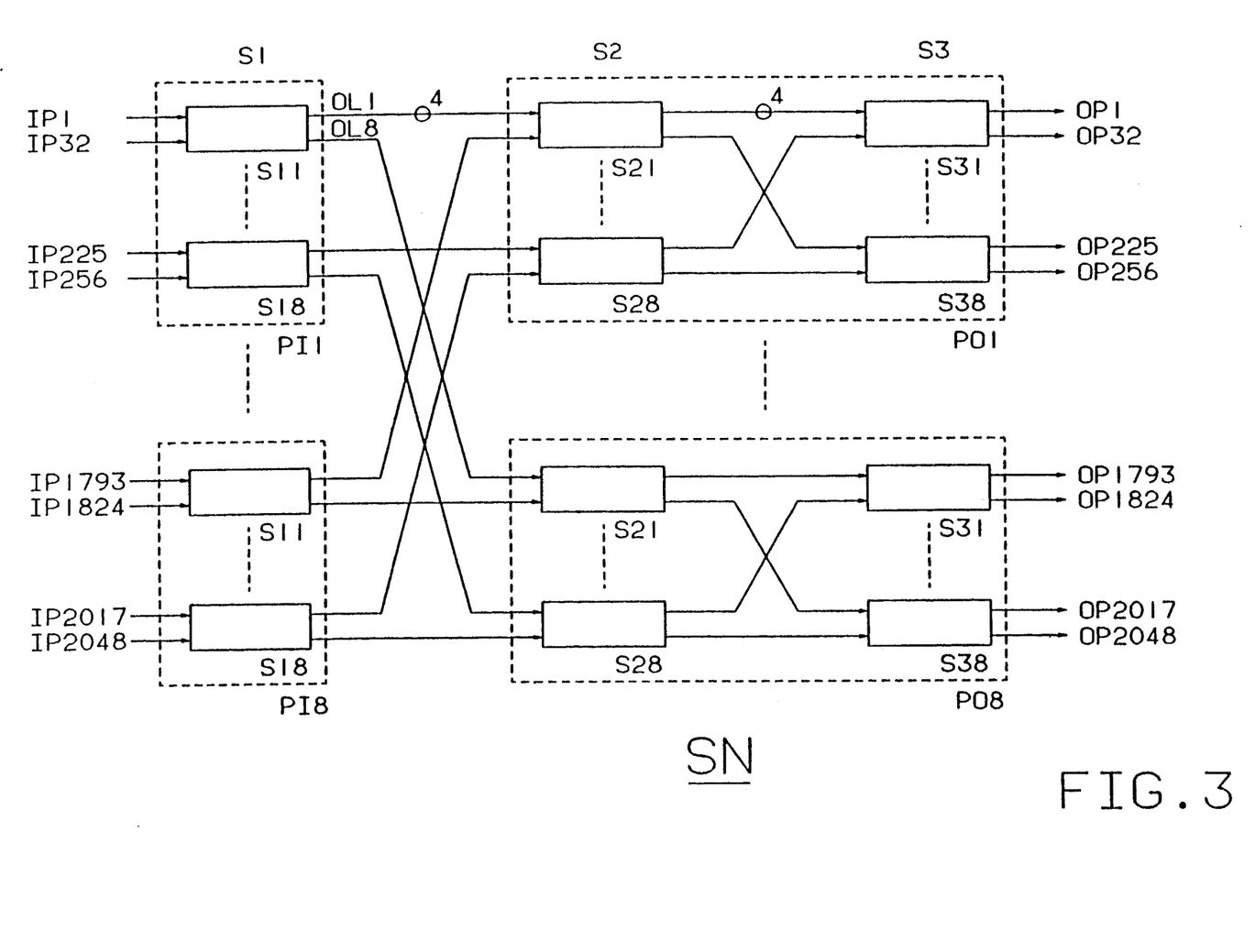
FIG. 3 represents in more detail a switching network SN included in a switching node N1, N2 or N3 of the telecommunication system of FIG. 1.

FIG. 3 shows a example of a 3-stage switching network SN with a regular trunking topology. SN has input ports IP1 to IP2048 and output ports OP1 to OP2048 to which are connected respective inputs and outputs of the corresponding switching node, i.e. N1, N2 or N3 by making reference to FIG. 1. The switching network SN is constituted by a plurality of switch elements such as S11 to S18, S21 to S28 and S31 to S38 which are interconnected by bundles of 4 internal links each, each bundle being represented by a single line. As shown, the switch elements are arranged in stages S1, S2 and S3. The stage S1 is arranged on 8 input planes PI1 to PI8 which each carry 8 switch elements S11-18, whilst the stages S2 and S3 are both located on 8 output planes PO1 to PO8 which each carry 16 switch elements, i.e. 8 switch elements S21-28 of the stage S2 and 8 switch elements S31-38 of the stage S3. Each switch element has 32 inlets and 32 outlets and the input ports IP1-2048 of SN are connected to the inlets of the switch elements S11-18 of the first stage S1, whilst the outlets of the switch elements S31-38 of the last stage S3 are connected to the output ports OP1-2048 of the switching network SN. The 32 outlets of each switch element of the stages S1 and S2 are arranged in 8 groups OL1 to OL8 of 4 outlets, each group being connected to a bundle of 4 internal links. A group of outlets is called a "routing group" and a cell to be transferred to such a routing group has in its routing data, a "routing group address". In that case, the cell may exit at anyone of the outlets constituting the group. Each routing group comprises at least all the outlets connected to the internal links of at least one bundle. In the present example, each routing group OL1/8 is connected to a distinct bundle of SN. Similarly, the 32 inlets of each switch element of the stages S2 and S3 are arranged in 8 groups of 4 inlets.

Refering again to FIG. 1, the switching network SN1 of the switching node N1 performs a single-link-to-link-group connection and operates as a distribution switch, the switching network SN2 of the switching node N2 performs a link-group-to-link-group connection and operates as a group switch, and the switching network SN3 of the switching node N3 performs a link-group-to-single-link connection and thus also operates as a concentration switch.

In the following part of the description a single-link-to-single-link connection, the link-group-to-single-link connection (as in SN3) and the single link to link group connection (as in SN1) will be successively explained by making reference to the switching network SN shown in the FIGS. 4, 5 and 6 respectively and which is similar to that shown in FIG. 3. As will become clear from these examples, the link-group-to-link-group connection performed by the switching network SN2 is only an extrapolation of the single-link-to-link-group connection performed by SN1 and will therefore not be discussed in detail.

As already mentioned, the routing data stored in the header of a cell is used for the routing of this cell, through the telecommunication system, e.g. from the input terminal I to the output terminal O. For the routing of the cell through a switching network SN, the routing data includes a Self-Routing Tag (SRT) which is for instance constituted by an Output Port Addresses (OPA) or by an Output Port Group Addresses (OPGA). An OPA is used when the cell has to exit at a single output of the switching node and thus at a corresponding single output port OP1/2048 of the switching network e.g. SN3, whilst an OPGA is used when the cell may exit at any output of a switching node and thus at any output port of a set of output ports (SOP) of the switching network, e.g. SN1 or SN2. An output port address (OPA) or output port group address (OPGA) is constituted by several sets of bits, each set identifying for one switch element through which the cell passes, one outlet or one routing group OL1/8 (group of outlets) to be selected for transferring the cell thereto. Thus, for a 3-stage switching network SN, the OPA or the OPGA comprises 3 sets of bits.

Figure 4:
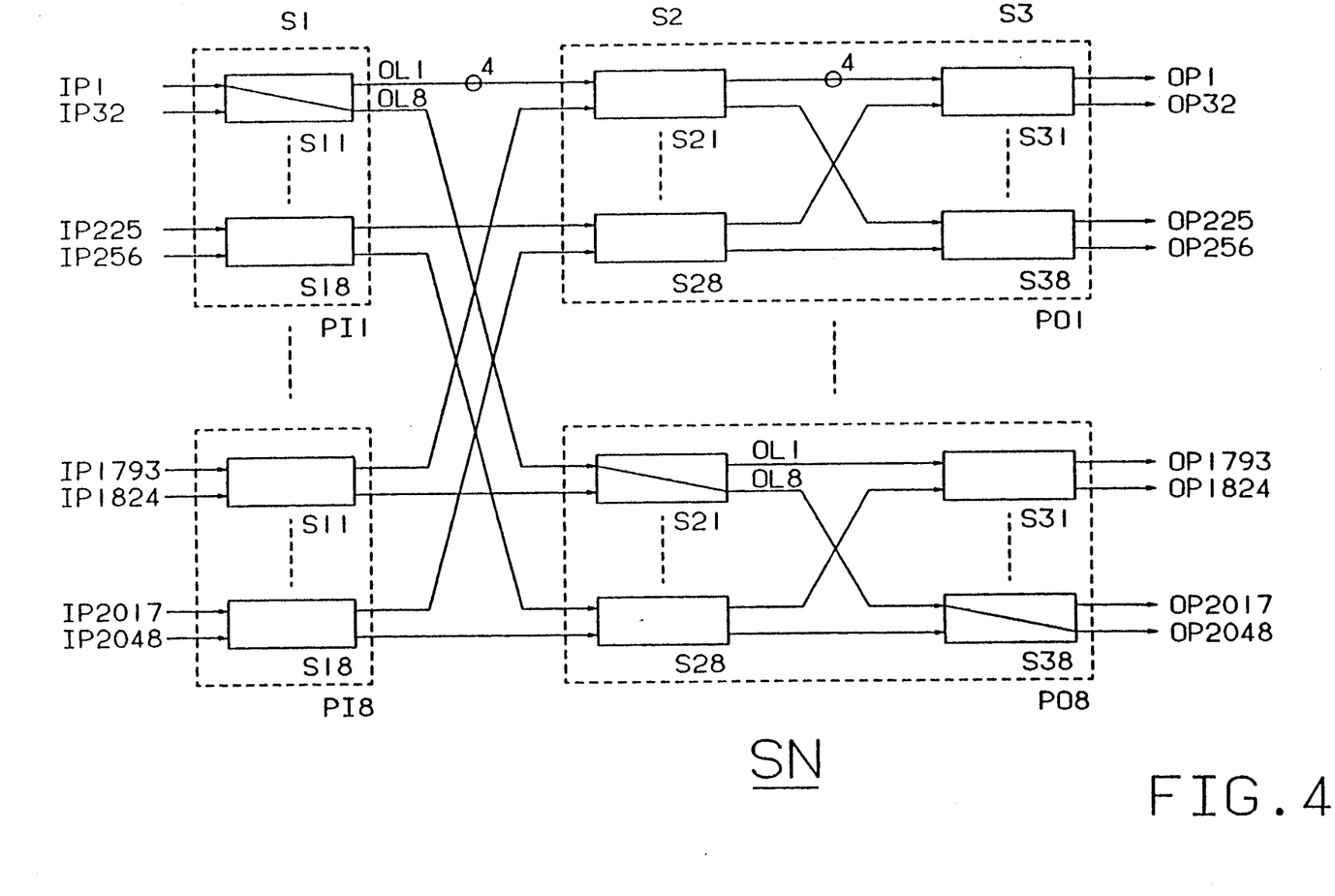
FIGS. 4 to 8 give different examples of a cell transfer through the switching network SN of FIG. 3.

For a single-link-to-single-link connection as shown in FIG. 4 where a cell has to be transmitted from the input port IP1 to the (single) output port OP2048 via the switch elements S11 of PI1 and S21, S38 of PO8, an output port address (OPA) is used. Thus the OPA comprises 3 sets of bits of which the 2 first sets are each constituted by 3 bits identifying one of the 8 possible routing groups OL1-8 of S11 and S21 respectively, whilst the third and last set of bits is constituted by 5 bits identifying one of the 32 outlets of S38. The OPA thus comprises in total 11 bits which encode the 2048 (=2\*\*11, where "\*" is the exponent sign) addresses of the output ports OP1-2048 of SN. In the example of FIG. 4, the OPA is 111,111,11111 whereby in the stage S1, PT1, S11 the last routing group OL8 is selected by S11 with the first set of bits 111, in the stage S2 PO8, S21 the last routing group OL8 is selected by S21 with the second set of bits 111, and in the stage S3 the 32nd outlet is selected by S38 with the third set of bits 11111, this latter outlet (number 32) being connected to the output port OP2048 of SN.

The distinct role of the switch elements of the stages S1, S2 and S3 is governed by individual routing mode parameters stored in each switch element. The initialization of these parameters in the switch elements and the way how a cell is internally routed to the selected outlet or routing group are explained in detail in the published International Patent Application No. WO91/02420 (PCT/EP89/00942) of Aug. 9, 1989, entitled "Communication switching element and method for transmitting variable length cells" and in the European Patent Application No. 90200594.1 of Mar. 14, 1990, entitled "Routing logic means for a communication switching element".

Figure 5:
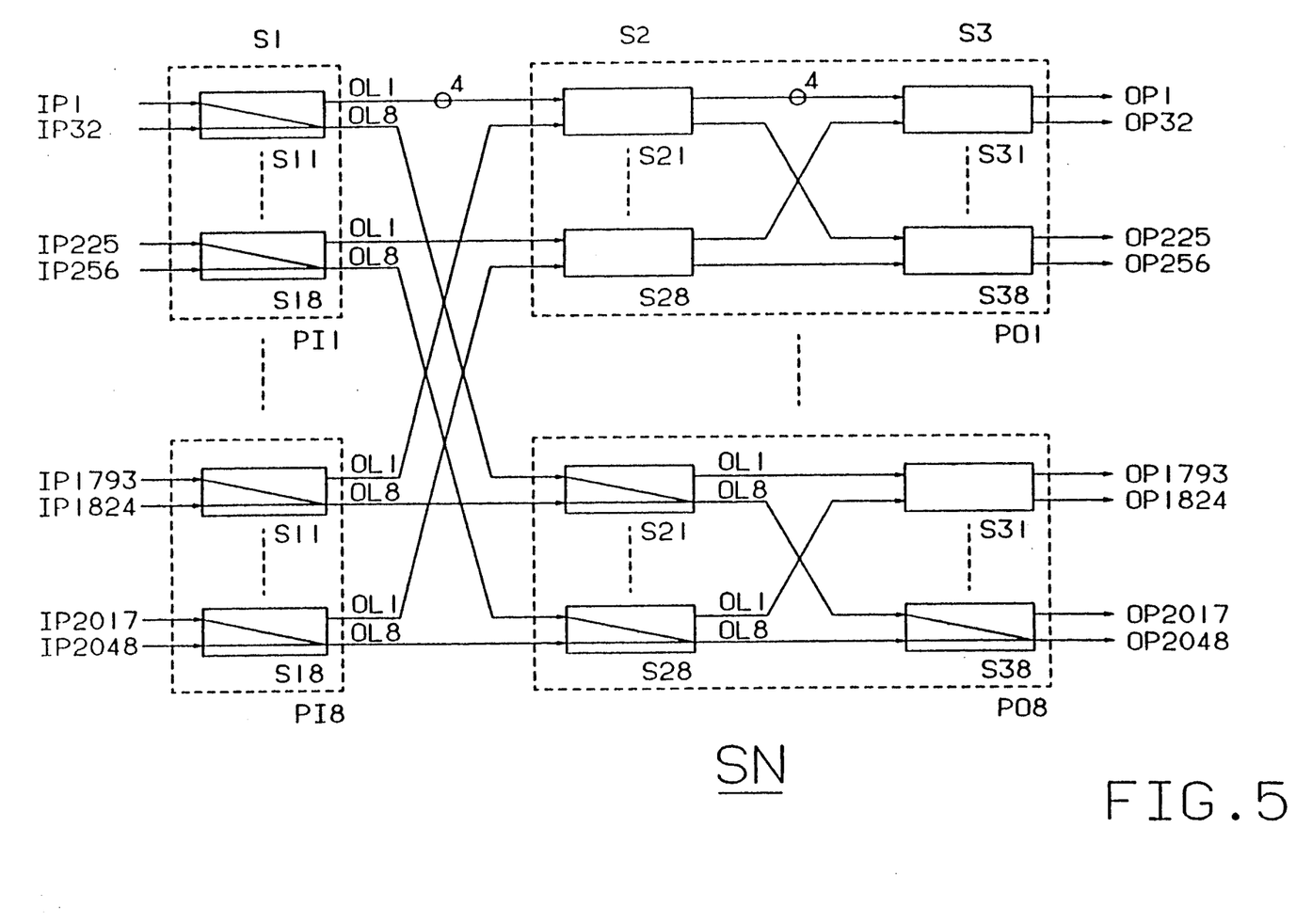

In FIG. 5, the same OPA as in FIG. 4 is used for transferring the cell from any of the input ports IP1 to IP2048, i.e. from a link group connecting to all these input ports of the switching network SN, to the single output port OP2048. Although the cell may arrive from any of the 2048 transmission links of this link group and may thus be supplied at any inlet of any of the 8×8=64 switch elements S11-18 of the first stage S1, the first set of 3 bits 111 of the OPA makes this cell always exit at the last routing group OL8 of the switch element of S1 where it arrives. From there, the cell is routed to an inlet group of one of the 8 switch elements S21-28 of the stage S2 on the last output plane PO8 where the last routing group OL8 is again selected by the second set of 3 bits 111 of the OPA. Then, the cell is transmitted to an inlet group of the switch element S38 of PO8 where it exits, according to the last set of 5 bits 11111 of the OPA, at the last (32nd) outlet connected to the output port OP2048 which is connected to an output connecting to a single transmission link.

As it appears from the previous examples, the routing process used in the switch elements of the 3 stages S1, S2 and S3 of SN is strictly independent of the input port IP1/2048 on which the cell is received. This is a unique property of self-routing switching networks such as SN.

Figure 6:
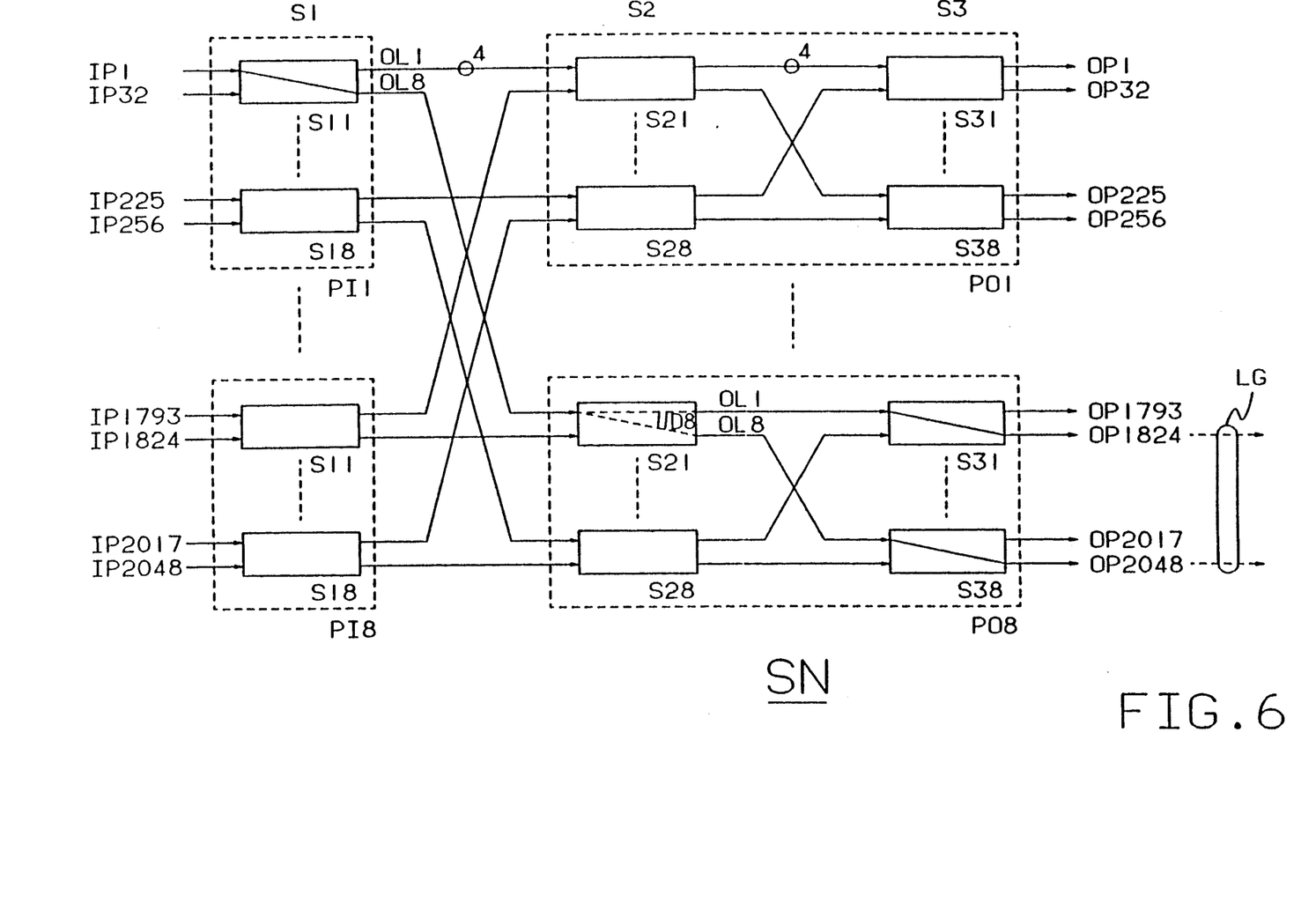

The example given in FIG. 6 concerns the transfer of a cell from a single input port IP1 to one output port belonging to a set of output ports (SOP) of which the addresses are 1792+k\*32, with k=1,2,3, . . . , 8 and where "\*" is the multiplication sign, e.g. to the output ports OP1824 or OP2048 connecting to corresponding transmission links of a same link group LG. In this case, an output port group address (OPGA) is used. This OPGA includes 3 sets of bits 111, xxx,11111, where 'xxx' indicates that a distribution has to be performed over the 8 routing groups OL1-8 of the switch element (S21) of the second stage S2 of SN. This distribution to 8 routing groups is indicated by D8 in the figures.

In the first stage S1 of SN, the routing is the same as described above in relation with the FIGS. 4 and 5, i.e. the cell exits at the routing group OL8 of S11 in PI1. However, in the second stage S2, no second set of 3 bits (xxx) has to be analyzed by the switch element S21 of PO8 because a distribution (D8) has to be performed over any the 8 routing groups OL1-8. The cell is thereby outputted at any of the 32 outlets of S21 and is applied to a first group of 4 inlets of a switch element S31/S38 of the third stage S3 on the output plane PO8. According to the last set of 5 bits 11111 of the OPGA, the last (32nd) outlet of the switch element S31/38 is selected so that the cell always exits at an outlet which is connected to an output port belonging the above set of output ports (SOP).

It is to be noted that, if all the 2048 output ports of SN are grouped in 256 sets of 8 output ports, each set being similar to the one considered in the example of FIG. 6 and connecting to the link group LG, and that the addresses of the output ports of a set (SOP) are linked in a regular way, e.g. by a single mathematical expression such as 1792+k\*32 with k=1 to 8, the number of bits used in the OPGA may be reduced from 11 (FIGS. 4 and 5) to 8 (FIG. 6) because 3 bits xxx of the OPGA are then never used. It can be proven that this conclusion is also valid when the switch element(s) performing the distribution is (are) located in the first stage S1 or in the last stage S3 of SN instead of being located in S2 as in the last example. In these two other cases, the OPGA may be written xxx,bbb,bbbbb and bbb,bbb,bbxxx respectively, where "b" indicates a valid bit 0 or 1. However, if the output ports are not grouped in a regular way, e.g. when some of them are connecting individually to a single transmission link, the routing process is not the same for all the switch elements of a same stage and the 3 bits xxx may not be eliminated from the OPGA. In this case however, the OPGA can sometimes be reduced to 10 or even 9 bits instead of the former 11 bits. If a distribution is performed in more than one stage of SN, the number of bits of the OPGA can even be more reduced. For instance, if the switch elements of both the stages S1 and S2 perform cell distribution (D8), the OPGA becomes xxx,xxx,bbbbb and may thus be reduced to 5 bits, e.g. if the OPGA=xxx,xxx,11111, the output ports having the addresses k\*32, with k=1,2,3, . . . , 64, e.g. the output ports OP32, OP256, OP1824 and OP2048, will be selected.

It is to be noted that when the number of bits of the OPGA is reduced, means have to be provided to indicate to each stage of SN which bits are valid or not.

A switch element having the cell distribution capability is disclosed in the above mentioned patent applications and an example of a switching network using such switch elements is disclosed in the French Patent Application FR-90.03246 of Mar. 14, 1991 entitled "Multi-path self-routing switching network for switching asynchronous time multiplexing cells". In the latter patent application, a multi-path self-routing switching network is disclosed and the switch elements used therein have the distribution capability. This distribution is however never used by the switch elements of the last stage of that switching network. The self-routing tag (SRT) is thus never constituted by an output port group addresses (OPGA) as explained above. The multi-path facility of that known switching network is however not required for the present invention as it appears from the previous examples where a simple self-routing switching network SN is described.

All the above examples relate to a point to point cell transfer because, even when link groups are mentioned, a cell is always transferred to a single transmission link of this group. Hereafter, the case of point-to-multipoint cell transfer, also called "multicast routing", will be considered. It is to be noted that switch elements provided with the point-to-multipoint cell transfer capability are disclosed in the above mentioned patent applications.

In case of point-to-multipoint cell transfer, the self-routing tag (SRT) associated to a cell does no more include an output port address (OPA) or an output port group address (OPGA) but a multicast tree reference number (MTRF). This MTRF is "translated" in each switch element of the switching network SN to provide a mask of one or more routing groups and indicating to which routing group(s) a cell or a copy thereof has to be routed. Although the MTRF is mainly used for multicast purpose, its translation resulting in a mask of one routing group, i.e. in the transfer of the cell to a single routing group, must be possible because a multicast routing has not necessary to be performed in every stage of SN. Owing to the MTRF and because each switch element performs its own translation, each copy of a cell may follow a different route in different switch elements of a same stage. This latter possibility cannot be performed by the above OPA or OPGA. The translation of the MTRF is for instance performed by using this MTRF as a pointer to a table storing several masks of routing groups. As in the case of point-to-point cell transfer, when a routing group is selected, the cell or a copy thereof, is transferred to this selected routing group and may exit at any outlet forming part of this group.

Figure 7:
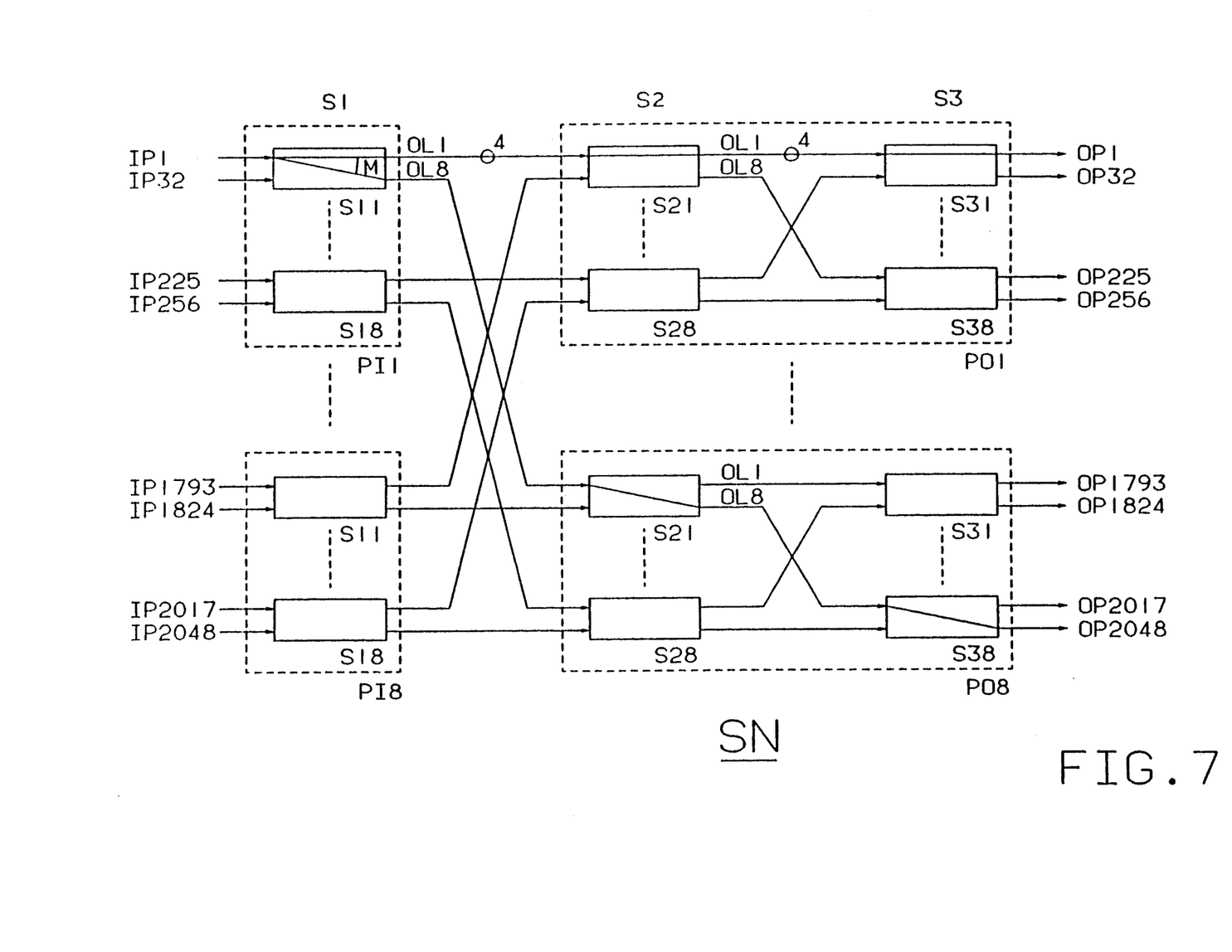

An example of a point-to-multipoint cell transfer where a cell received at the input port IP1 of SN has to be transferred to both the output ports OP1 and OP2048 is given hereafter by making reference to FIG. 7.

In this example, the first switch element S11 of the first stage S1 on the input plane PI1 of SN and wherein the cell is received, has the multicast capability indicated by M. This means that the cell received at the first inlet of S11 connected to the input port IP1 is duplicated in S11 and that one copy is transferred to the routing group OL1 while the other copy is transferred to OL8, both transfers being performed according to the multicast tree reference number (MTRF) of the self-routing tag (SRT) of the cell.

On the one hand, from OL1 of S11, the first copy of the cell is transmitted to a first group of inlets of the switch element S21 of the second stage S2 on the output plane PO1. By translating the MTRF, S21 selects its routing group OL1 and transfers the cell thereto. From there, the cell is transmitted to a first group of inlets of S31 on PO1. Again by translating the MTRF, S31 selects its first outlet and exits the cell to this outlet which is connected to the output port OP1 of the switching network SN.

On the other hand, from OL8 of S11, the second copy of the cell is transmitted to a first group of inlets of the switch element S21 of the second stage S2 but on the output plane PO8. By translating the MTRF, S21 selects its routing group OL8 and transfers the cell thereto. From OL8, the cell is further transmitted to a first group of inlets of S38 on PO8. Again by translating the MTRF, S38 selects its last outlet and exits the cell to this outlet which is connected to the output port OP2048 of the switching network SN.

As mentioned above, one can note that a same MTRF is translated differently in two equivalent switch elements S21 of the stage S2. Moreover, the same MTRF is also translated differently in the two switch elements S31 and S38 of the last stage S3. This different routing of the cell in different switch elements, e.g. of a same stage, is not possible when an OPA or an OPGA is used.

Figure 8:
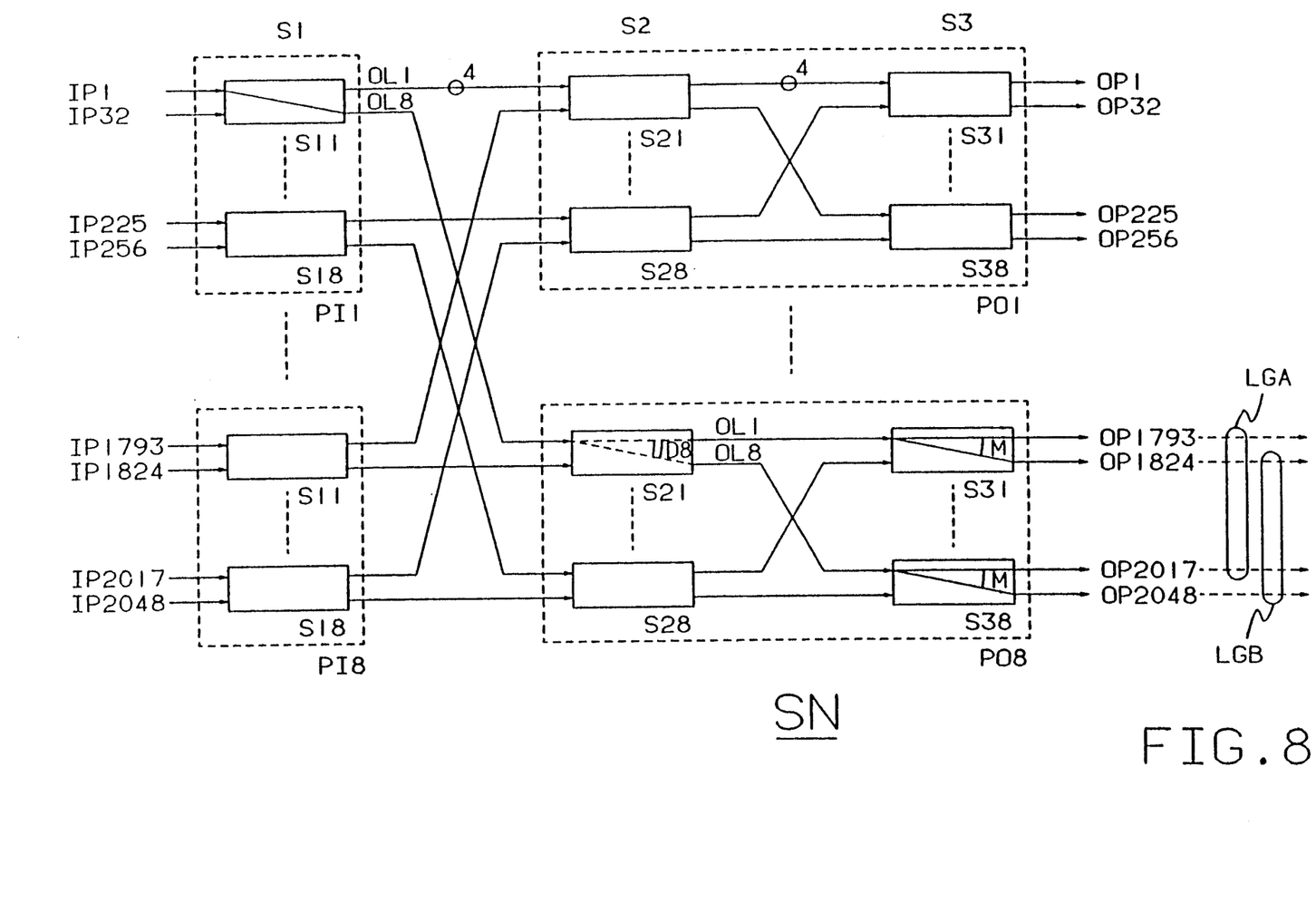

A last example of transfer of a cell through a switching network SN is given below by making reference to FIG. 8. Therein, the cell is received at the input port IP1 and has to be transferred both to a transmission link of a first link group LGA and to a transmission link of a second link group LGB, LGA being connected to the output ports having address 1761+k*32 and LGB being connected to the output ports having address 1792+k*32, with k=1,2,3, . . . ,8.

The cell received at the input port IP1 and thus at the first inlet of S11 on PI1 is associated to a MTRF which, translated by S11, is such that this cell is transferred only to the last routing group OL8 of S11. From there, the cell is transmitted to the first group of inlets of S21 on PO8 which, in function of the translation of the MTRF, distributes (D8) this cell to one of its routing groups OL1-8. According to the routing group OL1/8 of S21 at which the cell exits, this cell is transmitted to a first group of inlets of one of the switch elements S31-38 on PO8. By translating the MTRF, the latter switch element S31/38 then duplicates the cell, i.e. makes a copy of this cell, and transfers a first cell to its first outlet and the second one to its last (32nd) outlet. Because the first outlets of S31 to S38 on the plane PO8 are connected to the output ports connecting to the transmission links of the link group LGA and that the last (32nd) outlet of these switch elements S31-38 are connected to the output ports connecting to the transmission links of the link group LGB, the cell received at IP1 is transmitted to these two link groups as requested.

The above examples show that by using an OPA or OPGA, the switch elements are able to transfer a cell either to a single outlet, to a single routing group or to a routing group forming part of a distribution list (D8), whilst by using a MTRF the cell may also be transmitted to more outlets or to more routing groups.

After having described the transfer of a cell through a particular switching network SN, the transfer of this cell through the whole telecommunication system of FIG. 1, i.e. through different switching networks SN1, SN2 and SN3, in cascade will be discussed below.

When a cell arrives at an input terminal I of the telecommunication system, its associated routing data comprises external routing information which is for instance a virtual identifier such as the virtual connection, channel and/or path identifier (VCI/VPI) defined in the Asynchronous Transfer Mode (ATM) technique. Since the switching nodes N1, N2, N3 and more particularly the switching networks SN1, SN2, SN3 thereof internally use a self routing tag (SRT) which cannot be read directly from this external routing information, means have to be provided for deriving internal routing information from the external routing information, this internal routing information being the self-routing tag (SRT). These means are for instance constituted by translation means located between the inputs of a switching node and the input ports of the corresponding switching network, and by conversion means located between the outputs ports of the switching network and the outputs of the switching node. The translation means translate an incoming virtual identifier (VCIi/VPIi) into an outgoing virtual identifier (VCIo/VPIo) which will be the external routing information when the cell leaves the telecommunication system. Additionally, the translation means also provide a self-routing tag (SRT) which is added to the virtual identifier in the routing data of the cell, whilst the conversion means remove this SRT from the routing data so that only the virtual identifier remains.

In a first approach called node-by-node self-routing, each switching node N1, N2, N3 is provided with both the translation and the conversion means. This allows definition and usage of different self-routing tags in the different switching nodes through which the cell passes. Furthermore, because of the replicated translation and conversions no internal routing information intrinsic to a particular switching network, i.e. no SRT, is transferred through the link groups LG12 and LG23.

In another approach called end-to-end self-routing, only the first switching node N1 of the telecommunication system is provided with the translation means and only the last switching node N3 is provided with the conversion means. The external routing information or virtual identifier is thus only translated at the entry and converted at the exit of the telecommunication system. No replicated translations and conversions are performed between the switching nodes N1, N2, N3 nodes but some bandwidth overhead is required on the transmission link between these nodes because of the self-routing tag (SRT) which is transferred as part of the routing data through the link groups LG12 and LG23. Moreover, a unique SRT has to be used by the switching networks SN1, SN2, SN3 through the whole telecommunication system. As already mentioned, this self-routing tag (SRT) may include either an Output Port Address (OPA), an Output Port Group Address (OPGA) or a multicast tree reference number (MTRF).

While the principles of the invention have been described above in connection with specific apparatus, it is to be clearly understood that this description is made only by way of example and not as a limitation on the scope of the invention.

We claim:

1. Telecommunication system including at least a first (N1) and a second (N2, N3) switching node interconnected by a group (LG12, LG23) of at least two transmission links over which cells of information are transferred, each switching node (N1, N2, N3) including an asynchronous switching network (SN1, SN2, SN3) having input ports (IP1-2048) and output ports (OP1-2048) and including a plurality of switch elements (S11-38) arranged in several stages (S1-3) between said input ports and said output ports, the transmission links of said group (LG12, LG23) interconnecting at least one set of output ports of the switching network (SN1) of said first node (N1) with at least one corresponding set of input ports of the switching network (SN2, SN3) of said second node (N2, N3), each of said switch elements having inlets and outlets and being able to transfer a cell received on one of its inlets to one or several of its outlets as a function of routing data associated with said cell, the input ports (IP1-2048) and the output ports (OP1-2048) of each switching network (SN) corresponding to the inlets and to the outlets of the switch elements of a first (S1) and of a last (S3) of said stages respectively, wherein, in said first switching node (N1), the switching network (SN1) includes at least one switch element (S11/38) which possesses at least three outlets arranged in groups of outlets (OL1-8), each group of outlets comprising at least one outlet, that said routing data designates said set of output ports, said cell being transferred to one output port (OP1-2048) belonging to said set, and that, as a function of said routing data, said one switch element identifies a group (OL1/8) of its outlets and transfers said cell to one outlet selected from among the outlets of said identified group of outlets, wherein each cell is transferred through said switching networks (SN1, SN2, SN3) according to a self-routing method and in that the routing process of a cell through said second switching node (N2, N3) is independent of the input port (IP1/2048) out of said set of input ports at which said cell is received.

2. Telecommunication system, including at least a first (N1) and a second (N2, N3) switching node interconnected by a group (LG12, LG23) of at least two transmission links over which cells of information are transferred, each switching node (N1, N2, N3) including an asynchronous switching network (SN1, SN2, SN3) having input ports (IP1-2048) and output ports (OP1-2048) and including a plurality of switch elements (S11-38) arranged in several stages (S1-3) between said input ports and said output ports, the transmission links of said group (LG12, LG23) interconnecting at least one set of output ports of the switching network (SN1) of said first node (N1) with at least one corresponding set of input ports of the switching network (SN2, SN3) of said second node (N2, N3), each of said switch elements having inlets and outlets and being able to transfer a cell received on one of its inlets to one or several of its outlets as a function of routing data associated with said cell, the input ports (IP1-2048) and the output ports (OP1-2048) of each switching network (SN) corresponding to the inlets and to the outlets of the switch elements of a first (S1) and of a last (S3) of said stages respectively, wherein, in said first switching node (N1), the switching network (SN1) includes at least one switch element (S11/38) which possesses at least three outlets arranged in groups of outlets (OL1-8), each group of outlets comprising at least one outlet, that said routing data designates said set of output ports, said cell being transferred to one output port (OP1-2048) belonging to said set, and that, as a function of said routing data, said one switch element identifies a group (OL1/8) of its outlets and transfers said cell to one outlet selected from among the outlets of said identified group of outlets, wherein said set of output ports to one of which a cell has to be transferred is designated in said associated routing data by an output port group address.

3. Telecommunication system, including at least a first (N1) and a second (N2, N3) switching node interconnected by a group (LG12, LG23) of at least two transmission links over which cells of information are transferred, each switching node (N1, N2, N3) including an asynchronous switching network (SN1, SN2, SN3) having input ports (IP1-2048) and output ports (OP1-2048) and including a plurality of switch elements (S11-38) arranged in several stages (S1-3) between said input ports and said output ports, the transmission links of said group (LG12, LG23) interconnecting at least one set of output ports of the switching network (SN1) of said first node (N1) with at least one corresponding set of input ports of the switching network (SN2, SN3) of said second node (N2, N3), each of said switch elements having inlets and outlets and being able to transfer a cell received on one of its inlets to one or several of its outlets as a function of routing data associated with said cell, the input ports (IP1-2048) and the output ports (OP1-2048) of each switching network (SN) corresponding to the inlets and to the outlets of the switch elements of a first (S1) and of a last (S3) of said stages respectively,     wherein, in said first switching node (N1), the switching network (SN1) includes at least one switch element (S11/38) which possesses at least three outlets arranged in groups of outlets (OL1-8), each group of outlets comprising at least one outlet, that said routing data designates said set of output ports, said cell being transferred to one output port (OP-1-2048) belonging to said set, and that, as a function of said routing data, said one switch element identifies a group (OL1/8) of its outlets and transfers said cell to one outlet selected from among the outlets of said identified group of outlets,     wherein said routing data designates several sets of output ports, that said associated cell has to be transferred to one output port (OP1/2048) out of each of said sets, and that, as a function of said routing data, at least one switch element identifies a set of groups of outlets and transfers, for each group (OL1-8) of said identified set, said cell to one outlet selected from among the outlets of said group.

4. Telecommunication system according to claim 1, wherein said routing data comprises internal routing information relative to the routing of said associated cell inside a switching network (SN) and external routing information relative to the routing of said associated cell outside a switching network (SN1, SN2, SN3), that only the first switching node (N2) of said telecommunication system includes translation means to add said internal routing information to said routing data at the input ports (IP1-2048) of the switching network (SN1) of said first switching node (N1), and that only the last switching node (N3) of said telecommunication system includes conversion means to remove said internal routing information from said routing data at the output ports (OP1-2048) of the switching network (SN3) of said last switching node (N3), said added internal routing information being a function of said external routing information.

5. Telecommunication system according to claim 4, wherein said added internal routing information is used by all the switching networks (SN1, SN2, SN3) of the telecommunication system.

6. Telecommunication system according to claim 4, wherein said translation means further translate external routing information received at input ports (IP1-2048) of a switching network (SN) into other external routing information used at the output ports (OP1-2048) of said switching network.

7. Telecommunication system according to claim 1, wherein said cells have a fixed length.

8. Telecommunication system according to claim 7, wherein said cells are constituted by subcells each having a fixed length.

9. Telecommunication system according to claim 1, wherein said cells have a variable length and are constituted by subcells each having a fixed length.

* * * * *